(12) United States Patent
Balaramudu et al.

(10) Patent No.: US 11,828,234 B2
(45) Date of Patent: Nov. 28, 2023

(54) ACOUSTIC LINER FOR A HEAT ENGINE

(71) Applicant: General Electric Company, Schenectady, NY (US)

(72) Inventors: Vasanth Kumar Balaramudu, Bangalore (IN); Gosetty Sreeni Vasulu, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/091,418

(22) Filed: Nov. 6, 2020

(65) Prior Publication Data
US 2022/0145802 A1  May 12, 2022

(51) Int. Cl.
| | |
|---|---|
| *F02C 7/045* | (2006.01) |
| *F02C 7/24* | (2006.01) |
| *F23R 3/00* | (2006.01) |
| *F02K 1/82* | (2006.01) |
| *B64D 33/02* | (2006.01) |

(52) U.S. Cl.
CPC .............. *F02C 7/24* (2013.01); *F02C 7/045* (2013.01); *F02K 1/827* (2013.01); *F23R 3/002* (2013.01); *B64D 2033/0206* (2013.01); *F05D 2220/32* (2013.01); *F05D 2250/283* (2013.01); *F05D 2260/963* (2013.01)

(58) Field of Classification Search
CPC .......... F02C 7/045; F23R 2900/00014; B64D 2033/0206; F02K 1/827; F05D 2260/963; G10K 11/04
See application file for complete search history.

(56) References Cited

U.S. PATENT DOCUMENTS

| | | | | |
|---|---|---|---|---|
| 4,235,303 A | * | 11/1980 | Dhoore | B64D 33/02 428/6 |
| 5,952,621 A | * | 9/1999 | Curtis | F02C 7/045 181/213 |
| 6,182,787 B1 | * | 2/2001 | Kraft | F02C 7/045 181/292 |
| 7,753,654 B2 | | 7/2010 | Read et al. | |
| 7,963,362 B2 | | 6/2011 | Lidoine | |
| 9,334,059 B1 | * | 5/2016 | Jones | G10K 11/172 |
| 9,640,164 B2 | | 5/2017 | Gerken et al. | |
| 2002/0064453 A1 | * | 5/2002 | Tse | F02K 1/386 415/119 |
| 2005/0076644 A1 | * | 4/2005 | Hardwicke | F02C 7/24 60/772 |
| 2006/0169532 A1 | * | 8/2006 | Patrick | F02C 7/045 181/210 |
| 2006/0169533 A1 | | 8/2006 | Patrick | |

(Continued)

*Primary Examiner* — Gerald L Sung
(74) *Attorney, Agent, or Firm* — Dority & Manning, P.A.

(57) ABSTRACT

A heat engine including a liner extended along a first dimension and a second dimension, wherein the liner includes a plurality of cavities formed by a honeycomb structure. Each cavity forms a volume extended from an opening at a fluid contact side of the liner and along a third dimension substantially orthogonal to the first dimension and the second dimension. The opening at the fluid contact side includes a cross sectional area of each respective volume of the plurality of cavities. The plurality of cavities is non-uniform with respect to the cross sectional area at the opening along the first dimension, the second dimension, or both.

15 Claims, 6 Drawing Sheets

(56) References Cited

U.S. PATENT DOCUMENTS

| | | | |
|---|---|---|---|
| 2015/0367953 A1* | 12/2015 | Yu ......................... | F02C 7/045 |
| | | | 181/222 |
| 2017/0191414 A1 | 6/2017 | Martinez et al. | |
| 2017/0335708 A1 | 11/2017 | Kray et al. | |
| 2018/0229443 A1 | 8/2018 | Pham et al. | |
| 2019/0002663 A1 | 1/2019 | Sikeman et al. | |
| 2019/0270504 A1* | 9/2019 | Cedar ................. | G10K 11/172 |
| 2020/0217272 A1* | 7/2020 | Gangloff, Jr. ........ | F23M 20/005 |
| 2021/0277829 A1* | 9/2021 | Van Ness ............. | G10K 11/172 |

\* cited by examiner

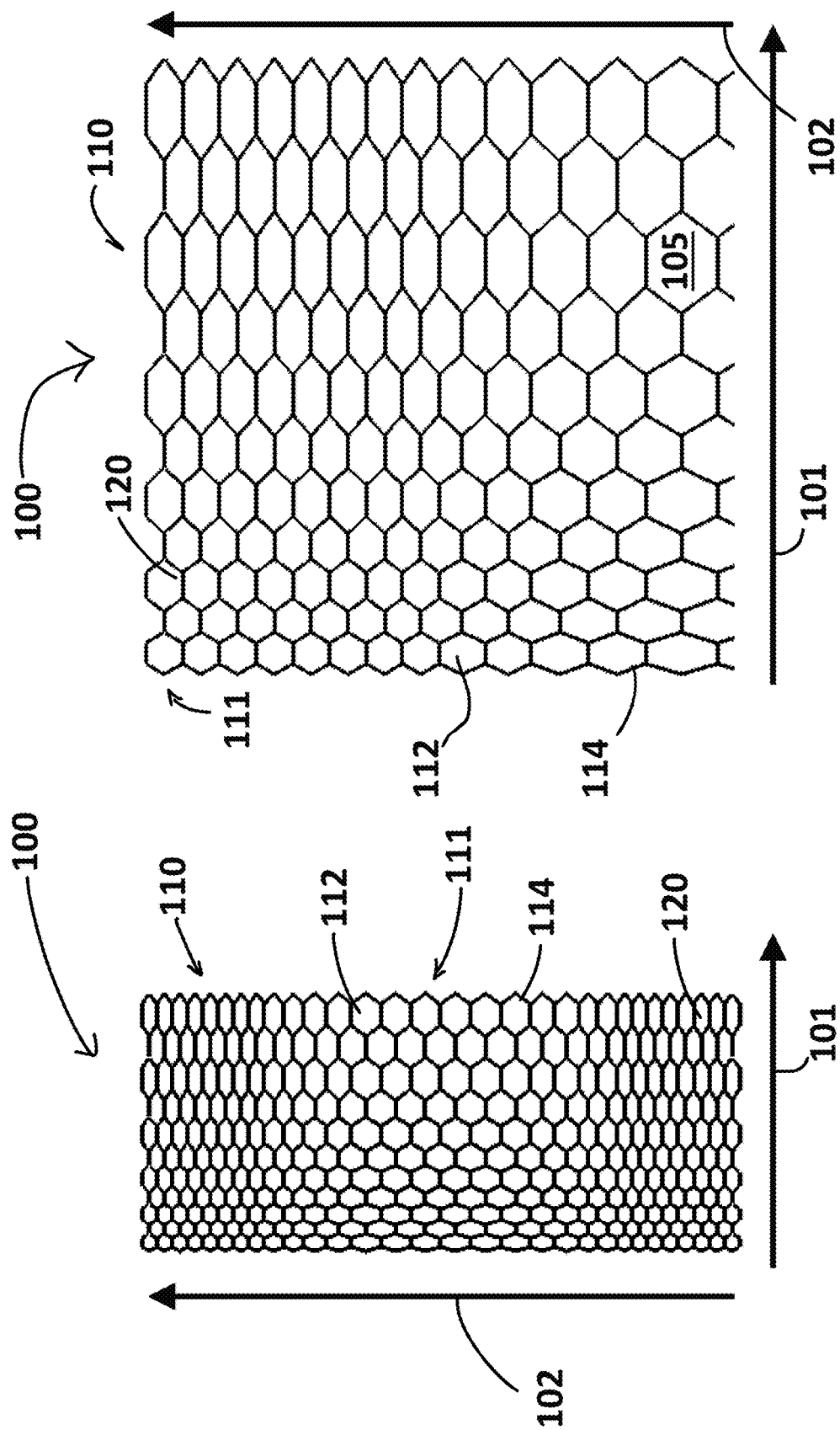

ACOUSTIC LINER FOR A HEAT ENGINE

FIELD

The present subject matter relates generally to acoustic liners for heat engines. The present subject matter relates particularly to acoustic liners for gas turbine engines.

BACKGROUND

Heat engines, such as gas turbine engines, are generally challenged to reduce or attenuate noises produced during operation. Although damper structures may be utilized to mitigate certain noises, conventional damper structures are generally limited to either a single frequency of attenuation, prone to excessive wear or deterioration at relatively hot or high-stress portions of an engine, or both. Such limitations may create challenges or complexities at the engine in attempt to attenuate such noises and/or mitigate wear and deterioration. As such, there is a need for a damper structure that attenuates multiple frequencies and is suitable for hot and high-stress environments.

BRIEF DESCRIPTION

Aspects and advantages of the invention will be set forth in part in the following description, or may be obvious from the description, or may be learned through practice of the invention.

An aspect of the present disclosure is directed to a heat engine including a liner extended along a first dimension and a second dimension, wherein the liner includes a plurality of cavities formed by a honeycomb structure. Each cavity forms a volume extended from an opening at a fluid contact side of the liner and along a third dimension substantially orthogonal to the first dimension and the second dimension. The opening at the fluid contact side includes a cross sectional area of each respective volume of the plurality of cavities. The plurality of cavities is non-uniform with respect to the cross sectional area at the opening along the first dimension, the second dimension, or both.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIGS. 3-7 are exemplary embodiments of a non-uniform acoustic liner according to aspects of the present disclosure.

Figure 1:
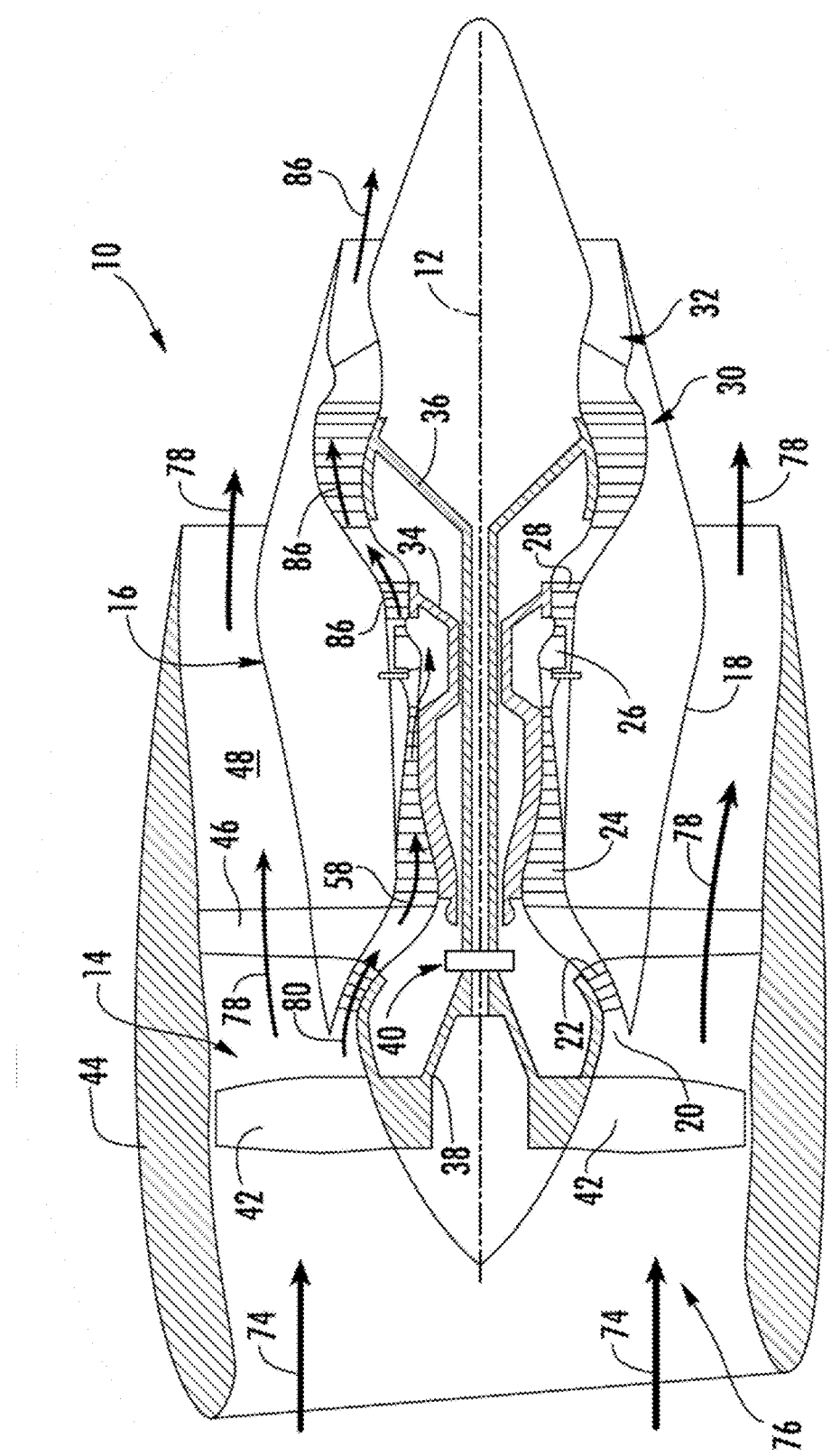
FIG. 1 is a cross sectional view of an exemplary heat engine including a liner according to aspects of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Embodiments of a liner having non-uniform acoustic attenuation characteristics is provided. The liner includes a plurality of cavities forming a honeycomb structure including a non-uniform acoustic cross sectional area with respect to one or more dimensions (e.g., an axial direction, a transverse direction, or a circumferential direction). Embodiments of the liner provided herein allow for varying distribution of volumes within each cavity, such as to provide a plurality of Helmholtz resonators configured to attenuate multiple frequencies. In various embodiments, the embodiments provided herein include single, unitary, monolithic liners configured to suppress or attenuate undesired acoustics at multiple frequencies. Embodiments of the liner may additionally provide noise suppression benefits at relatively hot and high-stress portions of an engine that multi-component liners, single degree of freedom (SDOF), or double degree of freedom (DDOF) liners may be insufficient to provide.

Referring now to the drawings, FIG. 1 is a schematic partially cross-sectioned side view of an exemplary heat engine 10 herein referred to as "engine 10" as may incorporate various embodiments of the present invention. Various embodiments of the engine 10 may be configured as a turbomachine. Certain embodiments may be configured as a turbofan, turboprop, turboshaft, turbojet, propfan or open rotor engine, or other suitable turbomachine configuration. Still various embodiments of the engine 10 may be configured generally as a ramjet or supersonic combustion ramjet (scramjet) engine. As shown in FIG. 1, the engine 10 has an axial or engine centerline axis 12 that extends there through for reference purposes. However, it should be appreciated that although certain components may extended annularly around the centerline axis 12, certain embodiments may, at least in part, extend in two-dimensions relative to the centerline axis 12. In various embodiments, an inlet and/or exhaust portion of the engine 10 is two-dimensional, such as to define a width and height in lieu of, or in addition to, a radial and circumferential dimension relative to the centerline axis 12.

In general, the engine 10 may include an inlet or fan assembly 14 through which a flow of oxidizer is received into the engine 10. A core engine or gas generator 16 is disposed downstream from the inlet or fan assembly 14. The gas generator 16 may generally include an outer casing 18 that defines an inlet 20. As noted above, the inlet 20 may define an annular inlet or a two-dimensional inlet. The outer casing 18 encases or at least partially forms, in serial flow relationship, a compressor section having a booster or low pressure (LP) compressor 22, a high pressure (HP) compressor 24, a heat addition or combustion section 26, a turbine section including a high pressure (HP) turbine 28, a low pressure (LP) turbine 30, and an exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 via a gear assembly 40 such as in an indirect-drive or geared-drive configuration. However, it should be appreciated that various embodiments of this disclosure may omit the gear assembly 40, such as to define a direct drive turbomachine.

As shown in FIG. 1, the fan assembly 14 includes a plurality of fan blades 42 that are coupled to and that extend radially outwardly from the fan shaft 38. A substantially annular fan casing or nacelle 44 circumferentially surrounds the fan assembly 14 and/or at least a portion of the gas generator 16. However, as noted above, it should be appreciated that the nacelle 44 may include, at least in part, a two-dimensional portion proximate to an inlet 76 at the nacelle 44 and/or exhaust nozzle section 32. It should be appreciated by those of ordinary skill in the art that the nacelle 44 may be configured to be supported relative to the gas generator 16 by a plurality of circumferentially-spaced outlet guide vanes or struts 46. Moreover, at least a portion of the nacelle 44 may extend over an outer portion of the gas generator 16 so as to define a bypass fluid flow passage 48 therebetween.

Figure 2:
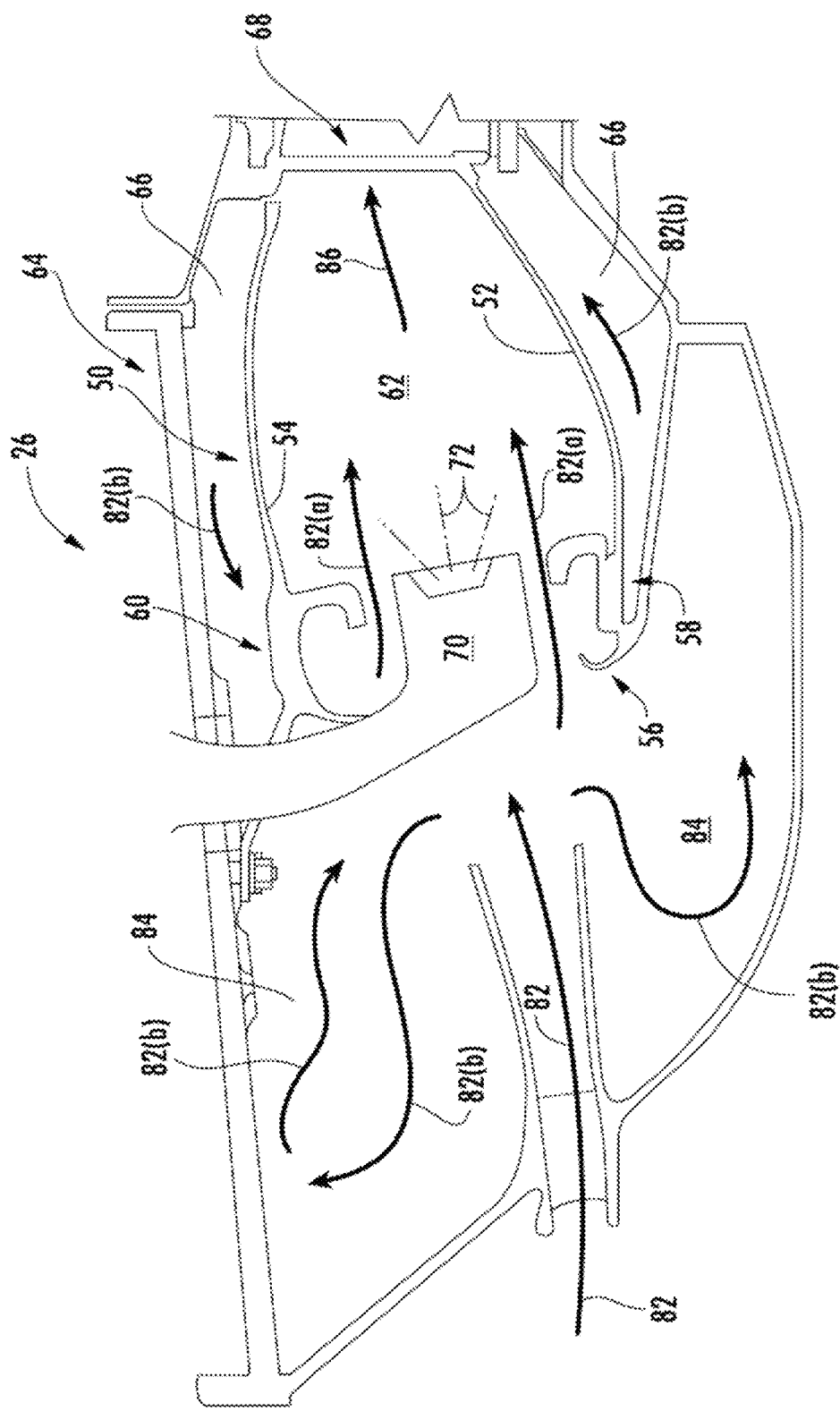
FIG. 2 is a cross sectional view of an exemplary combustion section of the heat engine of FIG. 1.
Figure 3:
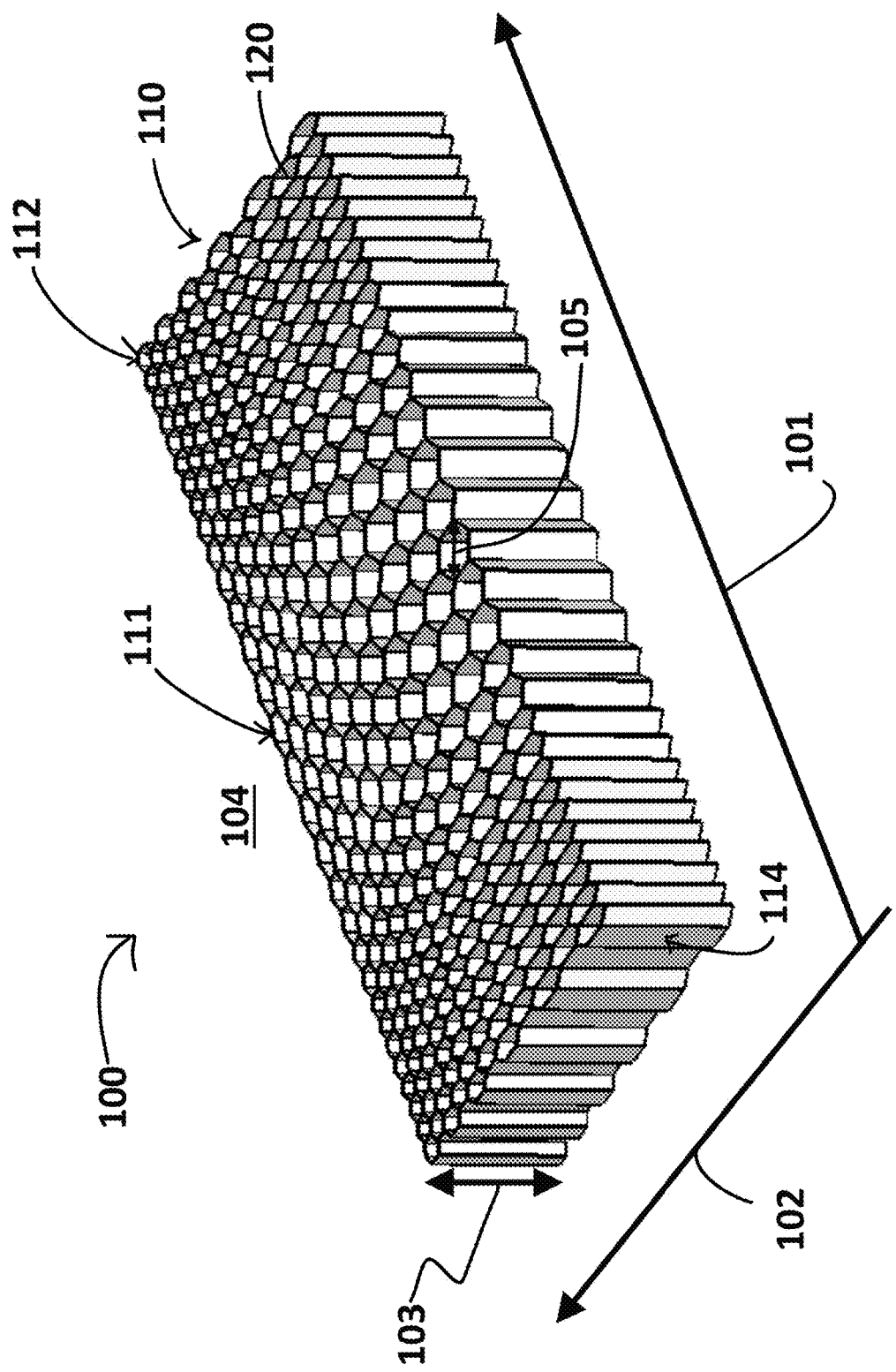
Figure 6:
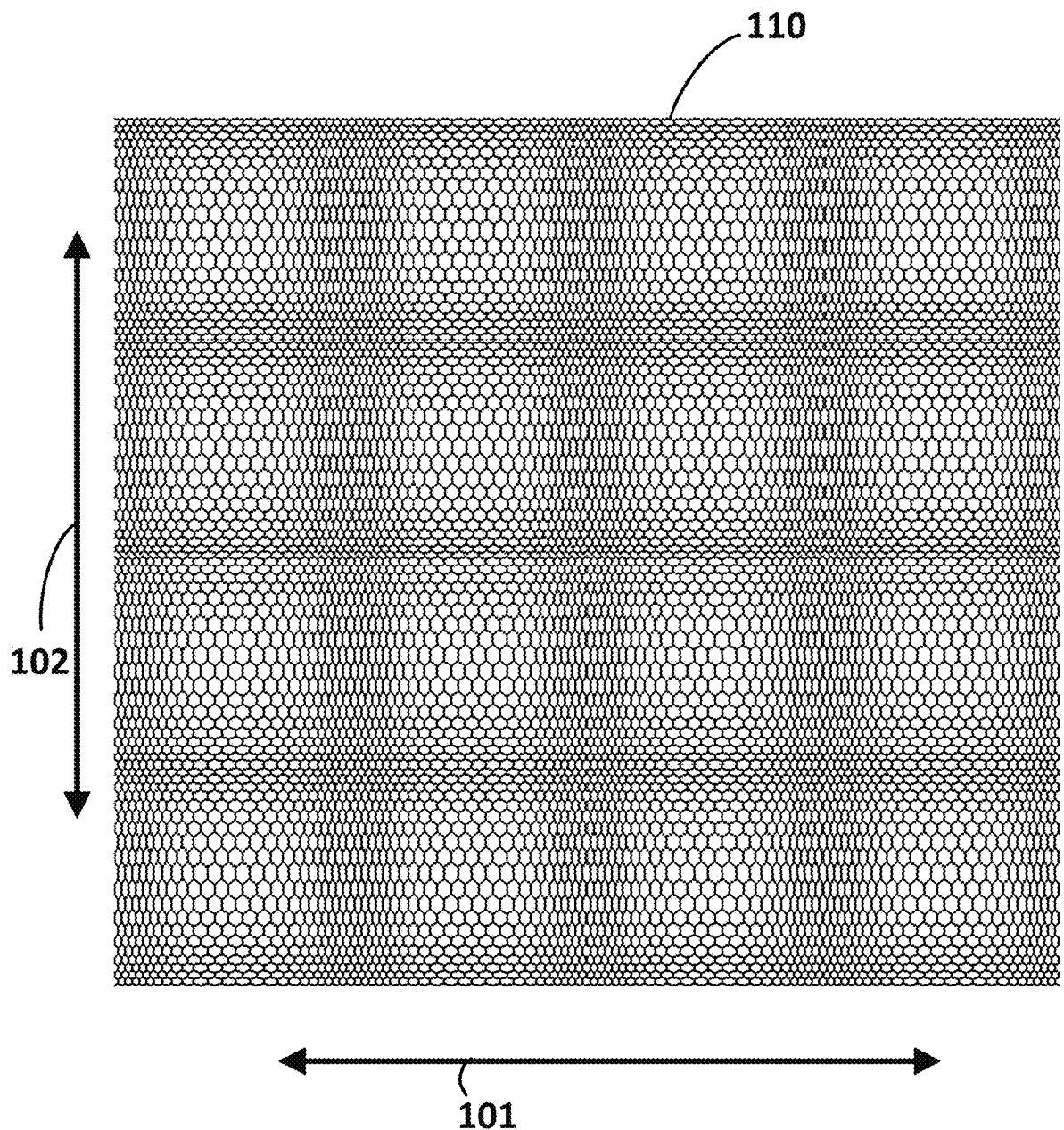

FIG. 2 is a cross sectional side view of an exemplary heat addition or combustion section 26 of the gas generator 16 as shown in FIG. 1. As shown in FIG. 2, the combustion section 26 may generally include an annular type combustor 50 having an annular inner liner 52, an annular outer liner 54 and a generally domed end 56 that extends radially between upstream ends 58, 60 of the inner liner 52 and the outer liner 54 respectfully. As shown in FIG. 2, the inner liner 52 is radially spaced from the outer liner 54 with respect to engine centerline 12 (FIG. 1) and defines a generally annular combustion chamber 62 therebetween. In particular embodiments, the inner liner 52 and/or the outer liner 54 may be at least partially or entirely formed from metal alloys or ceramic matrix composite (CMC) materials.

As shown in FIG. 2, the inner liner 52 and the outer liner 54 may be encased within a combustor or outer casing 64. An outer flow passage 66 may be defined around the inner liner 52 and/or the outer liner 54. The inner liner 52 and the outer liner 54 may extend from the domed end 56 towards a turbine nozzle or inlet 68 to the HP turbine 28 (FIG. 1), thus at least partially defining a hot gas path between the combustor 50 and the HP turbine 28. A fuel nozzle 70 may extend at least partially through the domed end 56 and provides a fuel 72 to the combustion chamber 62. Various embodiments of the combustor may be configured as a deflagrative combustor, a detonation combustor (e.g., rotating detonation, pulse detonation, etc.), a trapped vortex combustor, or other appropriate combustor configuration, or combinations thereof. Furthermore, the combustor may be configured as a rich-burn combustor, a lean-burn combustor, a rich-quench-lean combustor, or other suitable combustor type, or combinations thereof.

During operation of the engine 10, as shown in FIGS. 1-2 collectively, a volume of fluid, or particularly an oxidizer, as indicated schematically by arrows 74, enters the engine 10 through an associated inlet 76 of the nacelle 44 and/or fan assembly 14. As the fluid 74 passes across the fan blades 42 a portion of the fluid, as indicated schematically by arrows 78, is directed or routed into the bypass fluid flow passage 48 while another portion of the fluid, as indicated schematically by arrow 80, is directed or routed into the LP compressor 22. The fluid 80 is progressively compressed as it flows through the LP and HP compressors 22, 24 towards the combustion section 26. As shown in FIG. 2, the now compressed fluid, as indicated schematically by arrows 82, flows into a diffuser cavity or pressure plenum 84 of the combustion section 26 surrounding the combustion chamber 62.

The compressed fluid 82 pressurizes the diffuser cavity or pressure plenum 84. A first portion of the of the compressed fluid 82, as indicated schematically by arrows 82($a$) flows from the diffuser cavity 84 into the combustion chamber 62 where it is mixed with the a liquid and/or gaseous fuel 72 and burned or detonated, thus generating combustion gases, as indicated schematically by arrows 86, within the combustor 50. Typically, the LP and HP compressors 22, 24 provide more compressed fluid to the diffuser cavity 84 than is needed for combustion. Therefore, a second portion of the compressed fluid 82, as indicated schematically by arrows 82($b$), may be used for various purposes other than combustion. For example, as shown in FIG. 2, compressed fluid 82($b$) may be routed into the outer flow passage 66 of the pressure plenum 84 to provide cooling to the inner and outer liners 52, 54. Additionally, or alternatively, at least a portion of compressed fluid 82($b$) may be routed out of the diffuser cavity 84. For example, a portion of compressed fluid 82($b$) may be directed through various flow passages to provide cooling fluid to at least one of the HP turbine 28 or the LP turbine 30.

Referring back to FIGS. 1-2 collectively, the combustion gases 86 generated in the combustion chamber 62 flow from the combustor 50 into the HP turbine 28, thus causing the HP rotor shaft 34 to rotate, thereby supporting operation of the HP compressor 24. As shown in FIG. 1, the combustion gases 86 are then routed through the LP turbine 30, thus causing the LP rotor shaft 36 to rotate, thereby supporting operation of the LP compressor 22 and/or rotation of the fan shaft 38. The combustion gases 86 are then exhausted through the exhaust nozzle section 32 of the gas generator 16 to provide propulsive thrust.

As the fuel-oxidizer mixture burns, pressure oscillations may occur within the combustion chamber 62. These pressure oscillations may be driven, at least in part, by a coupling between the unsteady heat release dynamics of the flame, the overall acoustics of the combustor, unsteady or turbulent fuel flow, or transient fluid dynamics within the combustor 50. The pressure oscillations generally result in undesirable high-amplitude, self-sustaining pressure oscillations within the combustor 50. These pressure oscillations may result in intense, single-frequency acoustic waves that may propagate within the generally closed combustion section 26.

Depending, at least in part, on the operating mode of the combustor 50, these pressure oscillations may generate acoustic waves at frequencies ranging from about 50 Hz to about 1000 Hz or even higher. These acoustic waves may propagate downstream from the combustion chamber 62 towards the high pressure turbine 28 and/or upstream from the combustion chamber 62 back towards the diffuser cavity 84 and/or the outlet of the HP compressor 24. In particular, as previously provided, low frequency acoustic waves (50-250 Hz) such as those that occur during engine startup and/or during a low power to idle operating condition and/or higher frequency waves (250-1000 Hz) which may occur during takeoff and other operating conditions may reduce operability margin of the engine and/or may increase external combustion noise, vibration, or harmonics.

Referring now to FIGS. 3-7, embodiments of a liner 100 having a plurality of cavities 111 forming a honeycomb structure 110 are provided. The liner 100 includes a non-uniform acoustic cross sectional area 105 with respect to a first dimension 101 (e.g., an axial direction), a second dimension 102 (e.g., a transverse direction or circumferential direction), or both, allowing for varying distribution of volumes 120 within each cavity 111. In various embodiments, the cross sectional area 105 at each respective volume 120 is constant along a third dimension 103, such as a depth dimension of the cavity 111. The honeycomb structure 110 allows for variable frequency tuning along the first dimension and the second dimension. In still various embodiments, each cavity 111 is configured as a Helmholtz resonator. The plurality of cavities 111 allows the liner 100, such as a single liner segment, to suppress or attenuate undesired acoustics at multiple frequencies.

Each cavity 111 forms a respective volume 120 extended from an opening 112 at a fluid contact side 104 of the liner 100. The volume 120 is extended along the third dimension 103 substantially orthogonal to the first dimension 101 and the second dimension 102. The opening 112 at the fluid contact side 104 includes a respective cross sectional area 105 of the respective volume 120 of the plurality of cavities 111.

In particular embodiments, the third dimension 103, such as a depth of the liner, is constant relative to each cavity 111 of the plurality of cavities of the honeycomb structure 110. Stated differently, the third dimension 103 is unchanged across the plurality of cavities 111 relative to one another. The volume 120 defined at each cavity 111 varies relative to one or both of the first dimension 101, such as a direction of axial extension of the liner 100, and the second dimension 102, such as a direction of transverse extension (e.g., relative to a two-dimensional area noted herein) or a circumferential extension (e.g., relative to the centerline axis 12). Each volume is configured as a Helmholtz resonator formed by the volume 120, the cross sectional area 105, and the third dimension 103 of each cavity 111.

The cavity 111 defines a Helmholtz resonator in which a target frequency, or range thereof, of noise or pressure oscillations of which cavity 111 may attenuate may be defined by the equation:

$$f = \frac{c}{2\pi}\sqrt{\left(\frac{A}{VL'}\right)}$$

where f is the target frequency, or range thereof, to be attenuated; c is the velocity of sound in the fluid at the fluid contact side 104; A is the cross sectional area of an opening 115 through a perforated sheet 113 to each respective cavity 111; V is the volume 120 of the cavity 111; and L' is the effective depth through the perforated sheet 113 from the fluid contact side 104 to the volume 120. In various embodiments, the effective depth further includes a correction factor generally understood in the art multiplied by a length, width, or diameter of the opening 115 at the sheet 113.

In certain embodiments, the first dimension 101 at the liner 100 corresponds to the axial direction A of the engine 10 and the second dimension 102 corresponds to a circumferential direction relative to the centerline axis 12 or a transverse direction orthogonal to the axial direction A and the third dimension 103 or depth of the cavity 111. In a particular embodiment, the third dimension 103 corresponds to a radial direction extended from the centerline axis 12.

Referring still to FIGS. 3-7, in various embodiments, the honeycomb structure 110 includes a plurality of walls 114 forming the cross sectional area 105 at the opening 112 and the volume 120 at each respective cavity 111. In still various embodiments, the plurality of walls 114 is circular or polygonal, such as diamond, rectangular, hexagonal, or other suitable polygon. As provided above, the plurality of walls 114 is extended along the third dimension 103 constant relative to the plurality of cavities 111, such that a depth of each respective volume 120 is constant at the plurality of cavities 111. In still particular embodiments, the cross sectional area 105 is constant along the third dimension 103 or depth of the volume 120 of each cavity 111.

In certain embodiments, such as depicted in FIGS. 4-5, the plurality of cavities 111 varies linearly to provide the non-uniform and multiple frequency attenuation with respect to the cross sectional area 105 at the opening 112 along the first dimension 101 corresponding to the axial direction A the engine 10. In still certain embodiments, the plurality of cavities 111 is non-linearly non-uniform with respect to the cross sectional area 105 at the opening 112 along the first dimension 101. In some embodiments, the plurality of cavities 111 is linearly non-uniform with respect to the cross sectional area 105 at the opening 112 along the second dimension 102 corresponding to the circumferential direction or transverse direction. In still particular embodiments, the plurality of cavities 111 is non-linearly non-uniform with respect to the cross sectional area 105 at the opening 112 along the second dimension 102.

Referring now to FIGS. 1-7, the liner 100 may be positioned at one or more portions of the engine 10 to provide acoustic attenuation across multiple frequencies. As provided above, the target frequency of acoustic attenuation may vary based on engine operation, engine condition (e.g., wear, deterioration, damage, etc.), or environmental parameter (e.g., physical properties of the fluid, such as density, temperature, pressure, flow rate, acceleration, rate of change, etc.). The liner 100 provided herein may allow certain benefits over single degree of freedom (SDOF) or double degree of freedom (DDOF) acoustic liners typically having layered configurations of plates or openings. The liner 100 provided herein may be particularly suitable for relatively hot or high-stress portions of the engine 10, such as the combustion section 26, the turbines 28, 30, and exhaust nozzle section 32. In certain embodiments, the liner 100 is a single unitary component including the plurality of walls 114 forming the plurality of cavities 111. The liner 100 defining a single unitary or monolithic component may allow for multiple target frequency attenuation at relatively hot and high-stress environments while withstanding undesired wear or deterioration.

Figure 7:
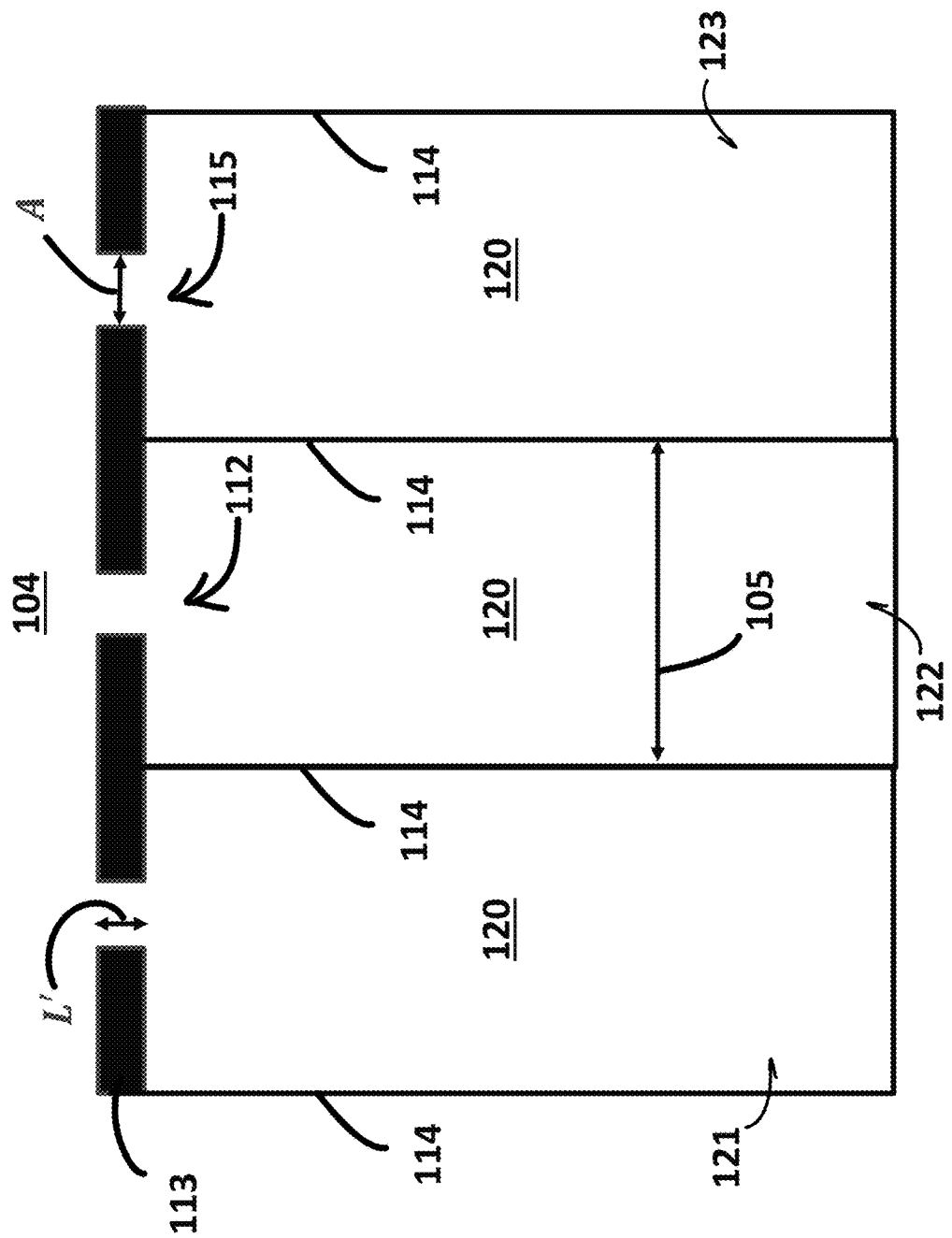

As such, in certain embodiments, the liner 100 is positioned at a casing surrounding a fluid flowpath such as described in regard to FIGS. 1-2. The fluid contact side 104 of the liner 100 is positioned at the fluid flowpath of the engine 10. In various embodiments, the liner 100 is positioned at the combustion section 26. The liner 100 including the plurality of cavities 111 may be configured to have a first plurality of cavities 121 configured to attenuate a first target frequency range, a second plurality of cavities 122 configured to attenuate a second target frequency range, and a third or more plurality of cavities 123 configured to attenuate a third or more target frequency range, such as depicted in FIG. 7. The target frequency ranges may correspond various engine operating conditions. In one embodiment, the first plurality of cavities is configured to target low frequency acoustic waves (50-250 Hz) such as those that occur during engine startup and/or during a low power to idle operating condition. The second and third pluralities of cavities are configured to target higher frequency waves (250-1000 Hz), such as may correspond to greater engine operating conditions. The second plurality of cavities may particularly target high frequency waves corresponding to high power or takeoff operation. The second plurality of cavities may particularly target a range of 750-1000 Hz. The third or more pluralities of cavities may target one or more engine operating conditions between low power and high power, such as a part load or cruise operating condition. The third plurality of cavities may particularly target a range of 250-750 Hz, or subsets thereof. However, it should be appreciated that the ranges may be adjusted according to desired engine configurations, operating conditions, or target frequencies.

In various embodiments, the liner 100 is positioned at the outer casing 64 at the combustion section 26. The fluid flowpath is the diffuser cavity or pressure plenum 84 surrounding the combustion chamber 62. In a particular embodiment, the fluid flowpath is the outer flow passage 66 surrounding the combustion chamber 62. The liner 100 positioned or integrated into the outer casing 64 allows the outer casing 64 to attenuate undesired noises or pressure oscillations occurring from the combustion section 26, such as due to the combustion process as described herein.

In another embodiment, the liner 100 is the inner liner 52, the outer liner 54, or both. In still another embodiment, the casing is the inner liner 52, the outer liner 54, or both, at which the liner 100 is positioned. The fluid flowpath is the combustion chamber 62. The liner 100 is configured to attenuate undesired noises or pressure oscillations such as described herein.

In still various embodiments, the liner 100 is positioned at the outer casing 18 surrounding the gas generator 16. In a particular embodiment, the liner 100 is positioned at the outer casing 18 surrounding one or more turbines 28, 30 and/or the exhaust nozzle section 32. The liner 100 positioned at or downstream of the turbines 28, 30 such as at the exhaust nozzle section 32, may allow for noise attenuation of jet combustion gases exiting the engine 10. In still particular embodiments, the monolithic liner 100 positioned at the exhaust nozzle section 32 may allow for multiple frequency acoustic attenuation while mitigating wear or deterioration generally associated with exposure to hot combustion gases.

Although the liner 100 depicted and described herein may provide multiple frequency attenuation at relatively hot and high-stress locations at the engine 10, such as the combustion section 26, the turbines 28, 30, or exhaust nozzle section 32, the liner 100 may be positioned at the nacelle 44 to attenuate noise or pressure oscillations upstream or downstream of the fan blades 42. In some embodiments, the fluid flowpath is the inlet 20, 76 upstream of the fan blades 42. In another embodiment, the fluid flowpath is the bypass flow passage 48 downstream of the fan blade 42.

The liner 100 described herein may be manufactured or formed using any suitable process, such as an additive manufacturing process, such as a 3-D printing process. The use of such a process may allow the liner 100 to be formed integrally, as a single unitary or monolithic component. In particular, the additive manufacturing process may allow such component to be integrally formed and include a variety of features not possible when using prior manufacturing methods, such as the plurality of cavities 111 tuned to attenuate multiple frequencies along the first dimension 101 and/or the second dimension 102.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although one applicable process includes adding material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets, laser jets, and binder jets, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The additive manufacturing processes described herein may be used for forming the liner 100 using any suitable material. For example, the material may be plastic, metal, ceramic, polymer, epoxy, photopolymer resin, or any other suitable material that may be in solid, liquid, powder, sheet material, wire, or any other suitable form or combinations thereof. The plastic, metal, ceramic, polymer, epoxy, photopolymer resin, or other suitable material may be included with the liner 100 positioned at the nacelle 44, such as described herein. In particular embodiments, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys (e.g., those available under the name Inconel® available from Special Metals Corporation). These materials are examples of materials suitable for use in the additive manufacturing processes described herein, and may be generally referred to as "additive materials." Such metals described herein may be particularly included with embodiments of the liner 100 positioned at the combustion section 26, the turbines 28, 30, or exhaust nozzle section 32, such as described herein. However, it should be appreciated that materials may be utilized in accordance with their intended operating conditions. For example, ramjet or scramjet applications may utilize materials suitable for relatively hot or high-stress conditions at inlet portions of the engine, such as upstream of the inlet 20, 76.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

Notably, in exemplary embodiments, several features of the liner 100 described herein were previously not possible due to manufacturing restraints, such as the pluralities of cavities 111 providing varying cross sectional areas 105 across the first dimension 101 and/or the second dimension 102. However, the present inventors have advantageously utilized advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A heat engine comprising a liner extended along a first dimension and a second dimension, wherein the liner comprises a plurality of cavities formed by a honeycomb structure, and wherein each cavity forms a volume extended from an opening at a fluid contact side of the liner and along a third dimension substantially orthogonal to the first dimension and the second dimension, and wherein the opening at the fluid contact side comprises a cross sectional area of each respective volume of the plurality of cavities, and further wherein the plurality of cavities is non-uniform with respect to the cross sectional area at the opening along the first dimension, the second dimension, or both.
2. The heat engine of any clause herein, wherein the third dimension is constant relative to each cavity of the plurality of cavities.
3. The heat engine of any clause herein, wherein each volume is a Helmholtz resonator formed by the volume, the cross sectional area, and the third dimension.
4. The heat engine of any clause herein, wherein the heat engine defines an axial direction co-directional to an engine centerline axis, and wherein the heat engine defines a circumferential direction relative to the engine centerline axis, and wherein the first dimension at the liner corresponds to the axial direction, and wherein the second dimension corresponds to the circumferential direction.
5. The heat engine of any clause herein, wherein the third dimension corresponds to a radial direction relative to the engine centerline axis.
6. The heat engine of any clause herein, wherein the honeycomb structure comprises a plurality of walls forming the cross sectional area at the opening and the volume at each respective cavity.
7. The heat engine of any clause herein, wherein the liner is a single unitary component comprising the plurality of walls forming the plurality of cavities.
8. The heat engine of any clause herein, wherein the plurality of walls is extended along the third dimension, and wherein the third dimension is constant relative to the plurality of cavities.
9. The heat engine of any clause herein, wherein the cross sectional area is constant along the third dimension of the volume of each cavity.
10. The heat engine of any clause herein, wherein the plurality of cavities is linearly non-uniform with respect to the cross sectional area at the opening along the first dimension corresponding to an axial direction co-directional to an engine centerline axis of the heat engine.
11. The heat engine of any clause herein, wherein the plurality of cavities is non-linearly non-uniform with respect to the cross sectional area at the opening along the first dimension corresponding to an axial direction co-directional to an engine centerline axis of the heat engine.
12. The heat engine of any clause herein, wherein the plurality of cavities is linearly non-uniform with respect to the cross sectional area at the opening along the second dimension corresponding to a circumferential direction relative to an engine centerline axis of the heat engine.
13. The heat engine of any clause herein, wherein the plurality of cavities is non-linearly non-uniform with respect to the cross sectional area at the opening along the second dimension corresponding to a circumferential direction relative to an engine centerline axis of the heat engine.
14. The heat engine of any clause herein, wherein the third dimension is constant relative to each cavity of the plurality of cavities, and wherein each volume is a Helmholtz resonator formed by the volume, the cross sectional area, and the third dimension, and further wherein the heat engine defines an axial direction co-directional to an engine centerline axis, and wherein the heat engine defines a transverse direction orthogonal to the axial direction, and wherein the first dimension at the liner corresponds to the axial direction, and wherein the second dimension corresponds to the transverse direction, and wherein the third dimension is orthogonal to the first dimension and the second dimension.
15. The heat engine of any clause herein, the heat engine comprising a casing surrounding a fluid flowpath, wherein the liner is positioned at the casing, and wherein the fluid contact side of the liner is positioned at the fluid flowpath.
16. The heat engine of any clause herein, wherein the fluid flowpath is a fan inlet upstream of a fan blade.

17. The heat engine of any clause herein, wherein the fluid flowpath is a bypass fluid flow passage downstream of a fan blade.
18. The heat engine of any clause herein, wherein the fluid flowpath is a combustion chamber.
19. The heat engine of any clause herein, wherein the fluid flowpath is a pressure plenum surrounding a combustion chamber.
20. The heat engine of any clause herein, wherein the fluid flowpath is downstream of a turbine.

What is claimed is:

1. A heat engine defining an axial direction co-directional to an engine centerline, a circumferential direction relative to the engine centerline, and a radial direction substantially orthogonal to the axial direction and the circumferential direction, the heat engine comprising:
   a liner extended along the axial direction and the circumferential direction,
   wherein the liner comprises a plurality of cavities formed by a honeycomb structure,
   wherein each cavity of the plurality of cavities forms a volume having a constant cross-sectional area along the radial direction,
   wherein each cavity of the plurality of cavities comprises an opening at a fluid contact side of the liner,
   wherein, along the axial direction, the plurality of cavities have non-uniform cross-sectional areas,
   wherein, along the circumferential direction, the plurality of cavities have non-uniform cross-sectional areas, and
   wherein the non-uniform cross-sectional areas of the plurality of cavities are formed in repeating patterns along the axial direction and the circumferential direction.
2. The heat engine of claim 1, wherein each cavity of the plurality of cavities is a Helmholtz resonator formed by the volume, the opening, and a length in the radial direction.
3. The heat engine of claim 1, wherein the honeycomb structure comprises a plurality of walls forming the cross-sectional area, the opening, and the volume at each respective cavity.
4. The heat engine of claim 3, wherein the liner is a single unitary component comprising the plurality of walls forming the plurality of cavities.
5. The heat engine of claim 1, wherein the plurality of cavities is linearly non-uniform with respect to the cross-sectional area along the axial direction.
6. The heat engine of claim 1, wherein the plurality of cavities is non-linearly non-uniform with respect to the cross-sectional area along the axial direction.
7. The heat engine of claim 1, wherein the plurality of cavities is linearly non-uniform with respect to the cross-sectional area along the circumferential direction.
8. The heat engine of claim 1, wherein the plurality of cavities is non-linearly non-uniform with respect to the cross-sectional area along the circumferential direction.
9. The heat engine of claim 1, the heat engine comprising:
   a casing surrounding a fluid flowpath, wherein the liner is positioned at the casing, and
   wherein the fluid contact side of the liner is positioned at the fluid flowpath.
10. The heat engine of claim 9, wherein the fluid flowpath is a fan inlet upstream of a fan blade.
11. The heat engine of claim 9, wherein the fluid flowpath is a bypass fluid flow passage downstream of a fan blade.
12. The heat engine of claim 9, wherein the fluid flowpath is a combustion chamber.
13. The heat engine of claim 9, wherein the fluid flowpath is a pressure plenum surrounding a combustion chamber.
14. The heat engine of claim 9, wherein the fluid flowpath is downstream of a turbine.
15. The heat engine of claim 1, wherein, for each of the plurality of cavities, the opening has an area that is smaller than the constant cross-sectional area along the radial direction.

* * * * *